United States Patent
Niedert et al.

(10) Patent No.: US 10,589,583 B2
(45) Date of Patent: Mar. 17, 2020

(54) SYSTEMS AND METHODS FOR MAGNETOELASTIC HITCH RECEIVER FORCE DETECTION

(71) Applicant: Ford Global Technologies, LLC, Dearborn, MI (US)

(72) Inventors: Andrew Niedert, Farmington Hills, MI (US); Rinku Patel, Kalamazoo, MI (US); Anton Rogness, Dearborn, MI (US); Elliott Pearson, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 15/815,640

(22) Filed: Nov. 16, 2017

(65) Prior Publication Data

US 2019/0143769 A1    May 16, 2019

(51) Int. Cl.
| | |
|---|---|
| *B60D 1/24* | (2006.01) |
| *B60D 1/62* | (2006.01) |
| *G01L 5/13* | (2006.01) |
| *G01L 1/12* | (2006.01) |
| *B60D 1/06* | (2006.01) |
| *B60D 1/48* | (2006.01) |

(52) U.S. Cl.
CPC ............... *B60D 1/248* (2013.01); *B60D 1/06* (2013.01); *B60D 1/485* (2013.01); *B60D 1/62* (2013.01); *G01L 1/125* (2013.01); *G01L 5/136* (2013.01)

(58) Field of Classification Search
None
See application file for complete search history.

(56) References Cited

U.S. PATENT DOCUMENTS

| | | | |
|---|---|---|---|
| 5,511,812 A | * | 4/1996 | Milner ............... B62D 53/0871 280/433 |
| 8,380,390 B2 | | 2/2013 | Sy et al. |
| 9,464,953 B2 | | 10/2016 | Wirthlin |
| 9,643,462 B2 | | 5/2017 | McAllister |
| 9,981,512 B2 | * | 5/2018 | Gentner ................... B60D 1/06 |

(Continued)

FOREIGN PATENT DOCUMENTS

| | | |
|---|---|---|
| DE | 102014217801 A1 | 3/2016 |
| EP | 2363307 B1 | 8/2014 |
| WO | WO-2018171937 A1 * | 9/2018 ............. B60D 1/248 |

OTHER PUBLICATIONS

Alvin Wirthlin, *Intelligent Hitch for Measuring Both Trailer Weight and Tongue Weight*, Jun. 26, 2015, 5 pages.

*Primary Examiner* — Joseph M Rocca
*Assistant Examiner* — Harold Eric Pahlck, III
(74) *Attorney, Agent, or Firm* — Ray Coppielle; Hanley, Flight & Zimmerman, LLC (57) ABSTRACT

Systems and methods for determining force direction and magnitude acting on a trailer hitch are disclosed. An example vehicle includes two magnetoelastic pins, having respective magnetic fields, configured to couple a trailer hitch receiver to a vehicle chassis. The vehicle also includes a plurality of sensors corresponding to the two magnetoelastic pins, configured to detect changes in the respective magnetic fields. And the vehicle further includes a processor configured to determine a magnitude and direction of a force acting on the trailer hitch receiver based on data from the plurality of sensors.

20 Claims, 5 Drawing Sheets

(56) References Cited

U.S. PATENT DOCUMENTS

| | | | |
|---|---|---|---|
| 2013/0253814 A1* | 9/2013 | Wirthlin | G01G 19/02 |
| | | | 701/124 |
| 2014/0360282 A1* | 12/2014 | Gie Ibl | B60D 1/248 |
| | | | 73/779 |
| 2015/0137482 A1 | 5/2015 | Woolf et al. | |
| 2019/0263204 A1* | 8/2019 | Reed | G01G 7/00 |
| 2019/0265112 A1* | 8/2019 | Reed | H01L 41/12 |

* cited by examiner

SYSTEMS AND METHODS FOR MAGNETOELASTIC HITCH RECEIVER FORCE DETECTION

TECHNICAL FIELD

The present disclosure generally relates to vehicle trailer hitch mechanisms and, more specifically, systems and methods for magnetoelastic hitch receiver force detection.

BACKGROUND

Many vehicles include a trailer hitch to which a trailer may be attached, allowing the vehicle to tow the trailer. The trailer hitch may be coupled to the vehicle via the vehicle chassis. These vehicles also may include a recommended tongue weight, percentage of the overall trailer weight, or other measure of the amount of weight that should be placed on the trailer hitch ball, to allow for the greatest vehicle performance and safety.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for detecting the magnitude and direction of various forces acting on a trailer hitch arm receiver that is coupled to a vehicle. An example disclosed vehicle includes two magnetoelastic pins, having respective magnetic fields, configured to couple a trailer hitch receiver to a vehicle chassis. The vehicle also includes a plurality of sensors corresponding to the two magnetoelastic pins, configured to detect changes in the respective magnetic fields. And the vehicle further includes a processor configured to determine a magnitude and direction of a force acting on the trailer hitch receiver based on data from the plurality of sensors.

An example disclosed method for determining a force acting on a trailer hitch receiver includes determining, by a plurality of sensors corresponding to two magnetoelastic pins configured to couple a trailer hitch receiver to a vehicle chassis, respective changes in magnetic fields corresponding to the two magnetoelastic pins. The method also includes receiving, by a vehicle processor, data corresponding to the respective changes in the magnetic fields. And the method still further includes responsively determining, by the vehicle processor, a magnitude and direction of a force acting on the trailer hitch receiver based on the data.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Embodiments disclosed herein may refer to measuring, determining, detecting, and other actions that can be taken with respect to a vehicle having a trailer hitch. It should be understood that the techniques described herein may be used to detect the general presence of a trailer, and that one or more actions or decisions may be made responsive to detecting the presence of a trailer, such as whether to activate or inhibit stability control functions, for example.

As noted above, many vehicles may include a trailer hitch that allows the vehicle to tow a trailer. Depending on the make, model, or other characteristics of the vehicle, there may be recommended best practices for towing. These best practices may include a recommended tongue weight percentage (e.g., 10-15% of the total weight of the trailer). This may ensure that the trailer is not tilted too far forward or backward while in use, and that the weight is evenly distributed on the trailer.

However it may be difficult or impossible for a driver to know whether he or she is in compliance with this best practice with just a visual inspection. And if the tongue weight is too high or too low, it may reduce the driving economy of the vehicle and may cause the driver to have a poor driving experience.

As such, it may be beneficial to provide a means by which a driver can know the tongue weight. Further, it may be beneficial for the driver to know the direction and magnitude of forces from the trailer acting on the trailer hitch. Understanding the direction and magnitude of the forces can enable the driver to know whether the tongue weight is too high or too low, whether the left or right side of the trailer has an issue causing the trailer to tilt or list off to one side, the overall mass of the trailer, and more. All this information can be used to provide a more positive and safe driving experience.

With these issues in mind, example embodiments of the present disclosure may include using force sensing pins to coupled a trailer hitch receiver to a vehicle chassis. The force sensing pins may include magnetoelastic pins, pins having an internal or external strain gauge, or any other type of force sensing pin. While embodiments herein may be described with respect to magnetoelastic pins in particular, it should be noted that one or more features of the disclosure may make use of a different type of force sensing pin in addition to or instead of magnetoelastic pins.

For an embodiment making used of magnetoelastic pins in particular, the pins may be used to couple a trailer hitch receiver to the vehicle chassis. Magnetic fields from the pins may change based on the direction and magnitude of forces acting on the pins (via the trailer hitch receiver), which can be monitored and analyzed by a vehicle processor to determine the direction and magnitude of the forces. The processor can then make one or more determinations based on the forces and/or changes in the forces, such as whether a safety issue has arisen based on unexpected or larger than expected changes in these forces, and an alert can be provided to the driver to take corrective action.

Figure 1:
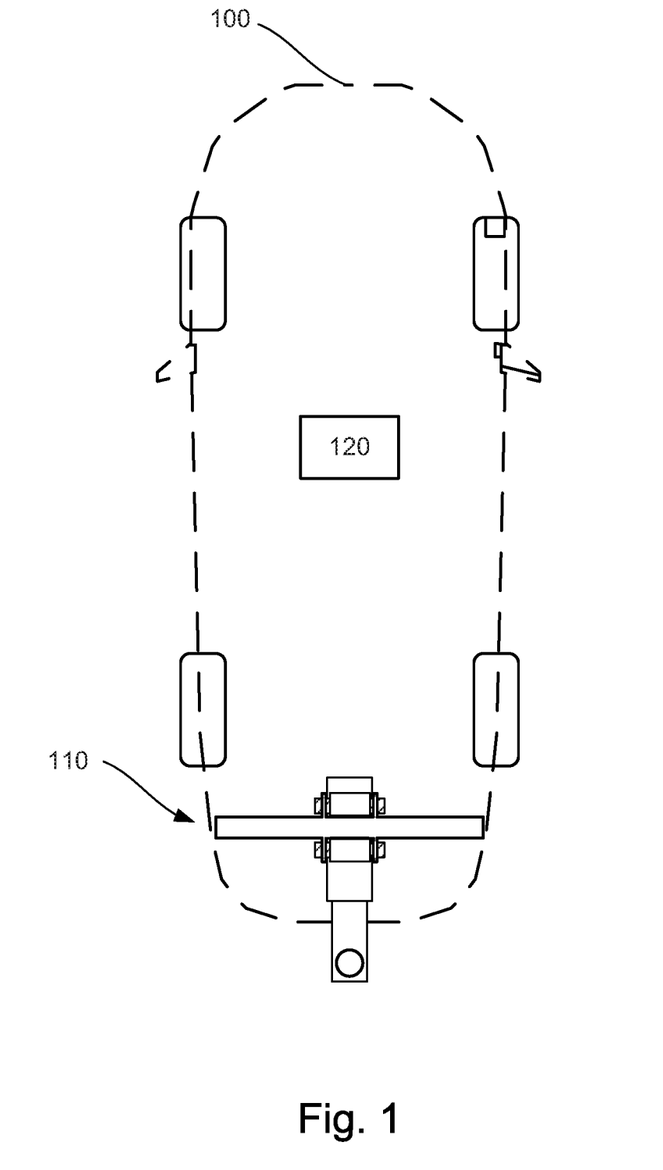
FIG. 1 illustrates an example vehicle according to embodiments of the present disclosure.

FIG. 1 illustrates an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components such as a processor 120.

Vehicle 100 is shown in FIG. 1 as having a trailer hitch mechanism 110 (described in more detail below), which may be coupled to a processor 120. The processor 120 may be configured to carry out one or more functions or actions described herein. In some examples, the processor 120 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). Processor 120 may be coupled with a memory (not shown) that may enable the processor to carry out the functions or actions described herein. The memory may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The memory may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory, the computer readable medium, and/or within the processor during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Figure 2A:
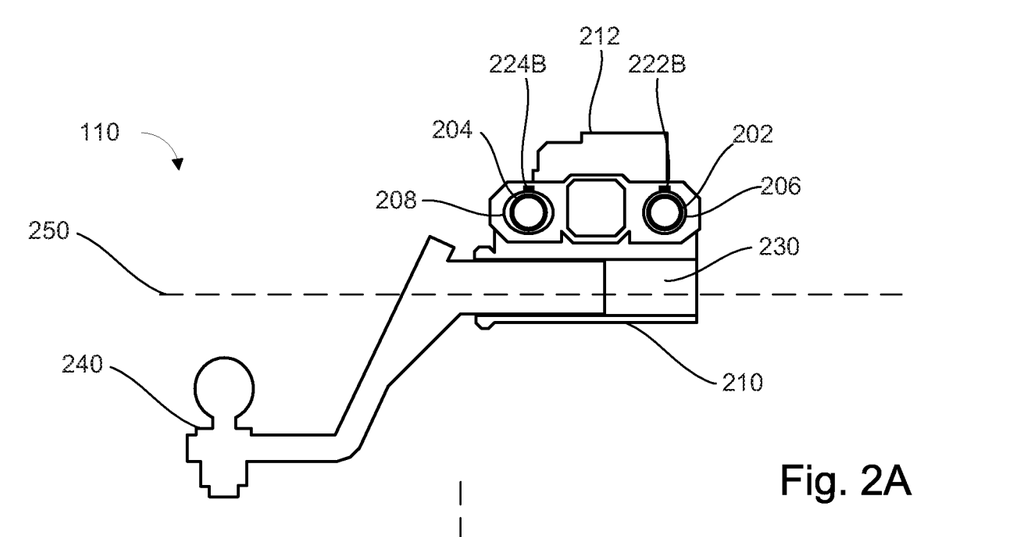
FIGS. 2A and 2B illustrate a side perspective cross-section view and a top perspective cross-section view of an example trailer hitch mechanism according to embodiments of the present disclosure.
Figure 2B:
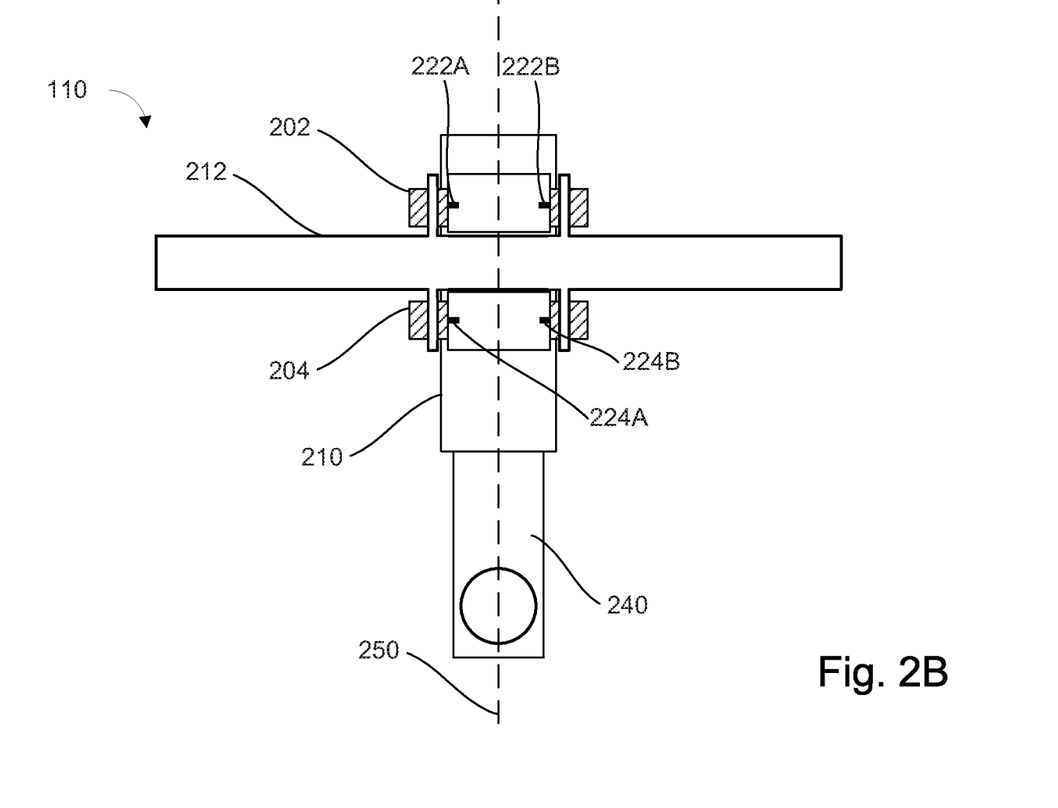

FIG. 2A illustrates a side perspective cross-section view of the example trailer hitch mechanism 110 of FIG. 1. FIG. 2B illustrates a top perspective cross-section view of the trailer hitch mechanism 110.

FIG. 2A illustrates two magnetoelastic pins 202 and 204 which couple a trailer hitch receiver 210 to a vehicle chassis 212. The trailer hitch receiver 210 in turn may include an opening 230 into which a trailer hitch arm 240 can be engaged and/or locked, which may allow a trailer coupled to the trailer hitch arm 240 to be towed by the vehicle.

Each magnetoelastic pin 202 and 204 may be magnetized such that it has a magnetic filed emanating therefrom. The magnetic fields of each pin may have one or more characteristics such as a size, shape, orientation, magnitude, and/or strength that can by sensed by one or more sensors 222A-B and 224A-B. There may also be additional sensors not shown in FIGS. 2A and 2B. In some examples, the magnetoelastic pins may be magnetized such that forces imparted on the magnetoelastic pins in one or more directions may cause a measurable change in the magnetic field. For instance, each magnetoelastic pin may be circularly magnetized, such that a force acting to flex or bend the pin may change the magnetic field from circular to helical, at least in part. Other magnetization schemes may be used as well.

Each magnetoelastic pin may have one or more corresponding sensors, configured to detect differences in the magnetic fields (or characteristics thereof) of the magnetoelastic pins. In some examples, the sensors may be configured to detect changes in the magnetic fields specific to each side or segment of the pin (e.g., measuring or detecting changes to the magnetic field on each side of the magnetoelastic pin, or measuring a gradient across the magnetoelastic pin). Other examples may include positioning sensors at various locations with respect to each magnetoelastic pin in order to detect changes in the magnetic fields due to fall forces acting to bend, flex, compress, or otherwise impact the pins.

In some examples, the sensor placement may be on a top, bottom, side, or placed around one or more of the magnetoelastic pins. FIG. 2A illustrates a sensor placement having a sensor placed on top of each magneto elastic pin, but it should be noted that other placements may be used as well. Further, the sensors may be placed in contact with the pins, or nearby but not in contact with the pins in order to provide a strong signal and accurately measure any changes to the magnetic fields.

As noted above, each magnetoelastic pin may be magnetized to have a particular magnetic field. The magnetic field maybe circular when the magnetoelastic pin is not under stress, and may change to a helical or other shaped magnetic field when a force is applied. In some examples the position of the sensors is determined based on an ability of the sensor configuration to measure forces in one or more directions. For instance, sensor placement on top or below the magnetoelastic pins may be effective in measuring a vertical force, whereas sensors positioned circularly around the pin may be effective at measuring a lateral or other direction of force. Further, two or more sensors may be used in combination to detect a single force or single force direction acting on a given magnetoelastic pin. In some examples, the sensors may be fluxgate magnetometers, hall effect sensors, or any other magnetic sensor.

In some examples, the magnetoelastic pins may be coupled to the vehicle chassis on two sides (as shown in FIG.

2B), and may be coupled to the trailer hitch receiver 210 in between the two points of contact with the chassis. This may provide a stable coupling between the chassis and the trailer hitch receiver via the two magnetoelastic pins. As such, in this orientation forces imparted on the trailer hitch receiver 240 may cause one or more of the magnetoelastic pins to flex symmetrically or asymmetrically depending on the force imparted onto the trailer hitch receiver.

Sensors 222A-B and 224A-B in FIG. 2B illustrate that one or more sensors can be positioned on a first (left) and second (right) side of the pin, configured to detect changes to the magnetic field of the magnetoelastic pins corresponding to each side in particular. This sensor placement can allow the sensors to detect changes in the magnetic fields of the pins that are asymmetric with respect to the pin axis, such as where the first side experiences a force in one direction while the second side experiences a force in a second direction.

Magnetoelastic pins 202 and 204 may flex or bend in predictable ways based on the direction and magnitude of forces imparted on the trailer hitch receiver that are carried through onto the magnetoelastic pins. And in turn, the magnetic fields of each magnetoelastic pin may change in predictable ways, which correspond to the direction and magnitude of the imparted forces. An amount of the flex may correspond directly to the magnitude of the force. As such, there may be a linear or non-linear positive correlation between the change in the magnetic field of a magnetoelastic pin and the direction and/or magnitude of the force imparted on it.

As noted above, the magnetoelastic pins may be configured to couple the trailer hitch receiver 210 to the vehicle chassis 212. FIG. 2A illustrates a circular coupling 206 on the chassis 212 that couples the first magnetoelastic pin 202 to the chassis 212. The circular coupling 206 may match the shape of the pin 202 such that all forces imparted on trailer hitch receiver 210 are experienced by pin 202.

The second magnetoelastic pin 204 may be coupled to the chassis 212 via an oblong coupling 208 of the chassis 212, shown in FIG. 2A. The oblong coupling 208 may have an oval shape, an elongated circle, or another similar shape. Coupling 208 may be longer along axis 250 than the first coupling 206, but may be the same length as coupling 206 in the direction perpendicular to axis 250 (i.e., up and down in FIG. 2A).

The oblong shape of coupling 208 may allow magnetoelastic pin 204 to slide or move by a small amount along the axis 250, but not along any perpendicular axis. With this configuration, horizontal forces may allow the front magnetoelastic pin 202 to experience a different force than the back magnetoelastic 204, because the back magnetoelastic pin 204 may be allowed to slide or move slightly before it is stopped and flexed by the forces acting on the trailer hitch receiver and coupling 208.

While FIG. 2A illustrates a circular coupling 206 and an oblong coupling 208 wherein the circular coupling is toward a front of the vehicle, it should be noted that the orientation may be flipped or changed, such that the circular coupling is in a back of the vehicle. Further, in some examples both couplings may be circular and/or both couplings may be oblong.

In some examples, a difference in flex of first magnetoelastic pin 202 within the circular coupling 206 and the second magnetoelastic pin 204 within the oblong coupling 208 can be used to determine a magnitude of a force acting on the trailer hitch receiver, as well as the direction of the force. This is described in further detail with respect to FIGS. 3A-D.

The Figures of this disclosure illustrate an example trailer hitch receiver 210 that is coupled to the chassis 212 underneath a horizontal bar of the chassis 212, such that the trailer hitch receiver 210 can hang below the chassis 212. However it should be noted that other orientations and configurations may be used as well, so long as the principal points of contact between the trailer hitch receiver 210 and the chassis 212 are the two magnetoelastic pins 202 and 204, and that any forces imparted on the trailer hitch receiver 210 are carried through onto the magnetoelastic pins 202 and 204.

In some examples, trailer hitch receiver 210 may include a channel or opening 230 configured to engage the trailer hitch arm 240. The opening 230 may be along a first axis 250. In some examples, the magnetoelastic pins 202 and 204 may be oriented perpendicular to the axis 250 along which the trailer hitch arm 240 is engaged with the opening 230 of the trailer hitch receiver 210. Further, in some examples, the pins 202 and 204 may be centered on the axis 250, as shown in FIG. 2B, such that a center of the magnetoelastic pins 202 and 204 runs through the axis 250. This may provide structural stability to the system.

A processor of the vehicle may be configured to receive data from the sensors indicating measurements of the magnetic fields from magnetoelastic pins 202 and 204. The data may then be analyzed by the processor to determine the direction and magnitude of an imparted force. As shown in FIGS. 3A-D, embodiments of the present disclosure may be configured to determine forces in a vertical direction, longitudinal direction, lateral direction, and rotational direction. Further, any force that is in another direction may be broken into its components that make up the force based on a vertical, longitudinal, lateral, and rotational direction.

A vertical force may refer to the up/down force on the trailer hitch receiver, such as the force caused by the weight of a trailer on the trailer hitch arm 240 while the vehicle is at rest. This force may be used to determine whether the tongue weight is within a recommended threshold, and/or to alert the driver to the amount of weight on the tongue of the trailer hitch arm 240.

A longitudinal force may refer to a front/back force on the trailer hitch, such as a force along the axis 250. This force may be most easily understood as a force on the trailer hitch receiver caused by acceleration and/or deceleration of the vehicle. When the vehicle accelerates from a stop to a given speed, the force on the trailer hitch may be relatively large to overcome the inertia of the trailer.

In some examples, the longitudinal force may be used as a basis to determine a mass of the trailer. The mass may be correlated with the magnitude of the longitudinal force, in connection with known vehicle acceleration, speed, braking, and other vehicle characteristics. These vehicle characteristics may be determined by one or more other vehicle sensors, or electronic control units, which are not shown in the Figures.

A lateral force may refer to the force imparted side to side on the trailer hitch arm. This force may result from the trailer being at an angle with respect to a centerline of the vehicle (e.g., axis 250), such as when the vehicle is in a turn. An extreme example may be if the vehicle and trailer are at an acute angle with respect to each other (sometimes referred to as a "jack-knife").

Another cause of a lateral force on the trailer hitch receiver 210 may be if one side of the trailer is heavier than the other side, if one tire is flat, underinflated, or otherwise different with respect to the other side. An asymmetry that causes one side of the trailer to lag behind the other may cause the trailer to turn and/or cause a sideways or lateral force on the trailer hitch arm 240.

A rotational force may refer to a rotation of the trailer along the centerline axis of the vehicle (e.g., a twisting of the trailer). For instance, where the vehicle is on a flat surface and the trailer is tilted toward the right side (e.g., from a flat tire on the right side, uneven road, or other cause), there may be a resulting rotational force imparted on the trailer hitch arm 240.

FIGS. 3A-D illustrate various forces acting on the system. When a force is imparted on the trailer hitch receiver, one or both of the magnetoelastic pins are configured to flex. By detecting the amount of flex (based on the changes in magnetic fields) of each magnetoelastic pin, as well as the differences in changes for each magnetoelastic pin, a processor can determine the magnitude of forces acting in a vertical direction, lateral direction, longitudinal direction, and rotational direction. The vertical direction, lateral direction, and longitudinal direction may all by perpendicular to each other. And by detecting forces in two or more of these directions at the same time (e.g., wherein the vertical and lateral directions are components of the overall force), various other directions or components of the forces can be determined as well.

Figure 3A:
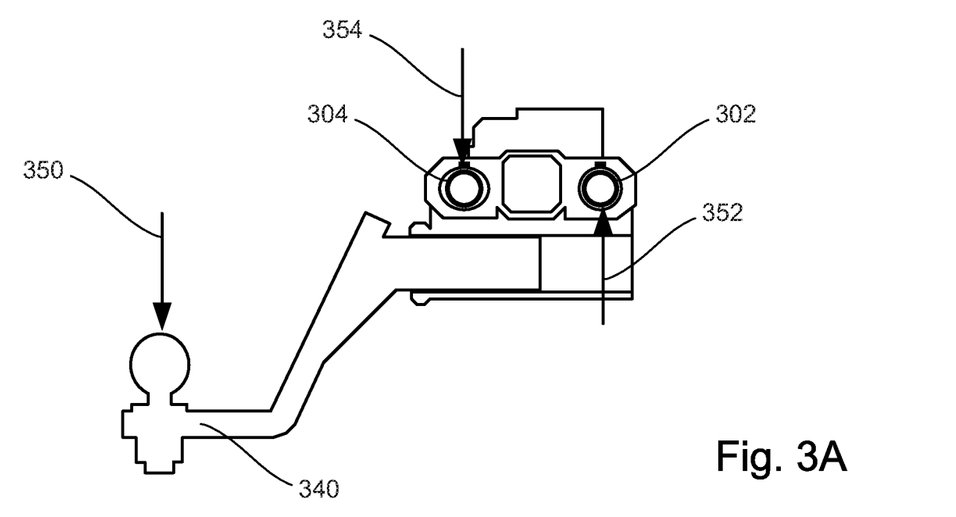
FIGS. 3A-3D illustrate the direction of forces acting on various parts of the trailer hitch mechanism for a vertical force, longitudinal force, lateral force, and rotational force respectively, according to embodiments of the present disclosure.

FIG. 3A illustrates a vertical force being imparted on the trailer hitch arm 340 (and thus the trailer hitch receiver and pins 304 and 302). As described above, the vertical force may be due to the weight of the trailer (or lack thereof) on the tongue of the trailer hitch arm 340. Where the force is imparted in a downward direction shown by arrow 350, the resulting force acting on pins 302 and 304 may be in the direction of arrows 352 and 354 respectively. In this example, the processor may determine based on data from the sensors that the first magnetoelastic pin 302 has flexed in a first direction (up in FIG. 3A), and that the second magnetoelastic pin 304 has flexed in a second direction that is opposite the first direction (down in FIG. 3A). The processor may then responsively determine that at least one component of the force acting on the trailer hitch receiver is in the vertical direction. The magnitude of the force may be determined based on a detected change in the magnetic field of either or both of pins 302 and 304.

While FIG. 3A illustrates a downward vertical force acting on the trailer hitch arm 340 (e.g., due to a trailer with too much weight on its front, for example), it should be noted that an upward vertical force can be detected as well. In that case, the direction of forces acting on magnetoelastic pins 302 and 304 may instead be reversed.

Figure 3B:
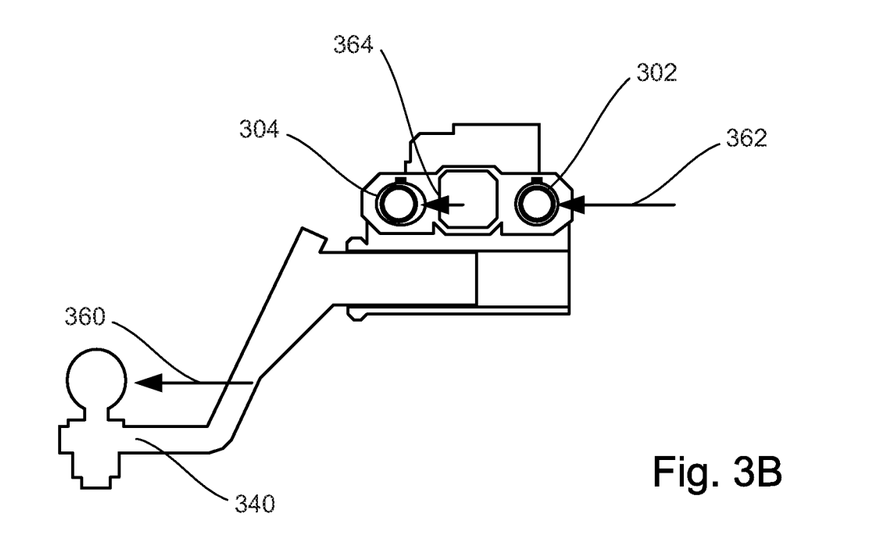

FIG. 3B illustrates the forces on magnetoelastic pins 302 and 304 when a longitudinal force is imparted on the trailer hitch arm 340. As noted above, the longitudinal force may be caused by an acceleration or deceleration of the vehicle with respect to the trailer. When the vehicle accelerates from rest to a given speed, the vehicle may have to overcome the trailer's inertia, causing the trailer hitch arm to experience a longitudinal force.

As shown in FIG. 3B, when a longitudinal force 360 acts on the trailer hitch arm 340, a corresponding force may be felt in either or both of magnetoelastic pins 302 and 304. Magnetoelastic pin 302 may be coupled to the chassis via a circular coupling, while magnetoelastic pin 304 is coupled to the chassis via an oblong coupling, as described above with respect to FIG. 2A. As such, when a longitudinal force is imparted, the second magnetoelastic pin 304 may be configured to slide within the oblong channel slightly before it begins to flex. The processor may be configured to determine that the first magnetoelastic pin 302 has flexed in a first direction by a first amount, as shown by arrow 362. The processor may also be configured to determine that the second magnetoelastic pin 304 has flexed in the first direction (i.e., the same direction as the first magnetoelastic pin) by a second amount, shown by arrow 364. The second magnetoelastic pin 304 may flex by a lesser amount than the first magnetoelastic pin 302, due to its ability to slide within the oblong coupling. In some examples, a longitudinal force may not cause the second magnetoelastic pin 304 to flex in the longitudinal direction at all. The processor may thus be able to responsively determine that a longitudinal force is acting on the trailer hitch receiver, and determine the magnitude of the force determine a magnitude of the longitudinal force based on a differential between the first amount and the second amount. In some examples, the force on the first magnetoelastic pin 302 may be determined to be a large force, while the force on the second magnetoelastic pin 304 in the longitudinal direction may be determined to be zero. This may be due to the ability of the second pin 304 to slide within the oblong coupling, such that the force shown as arrow 364 may be negligible or zero.

Figure 3C:
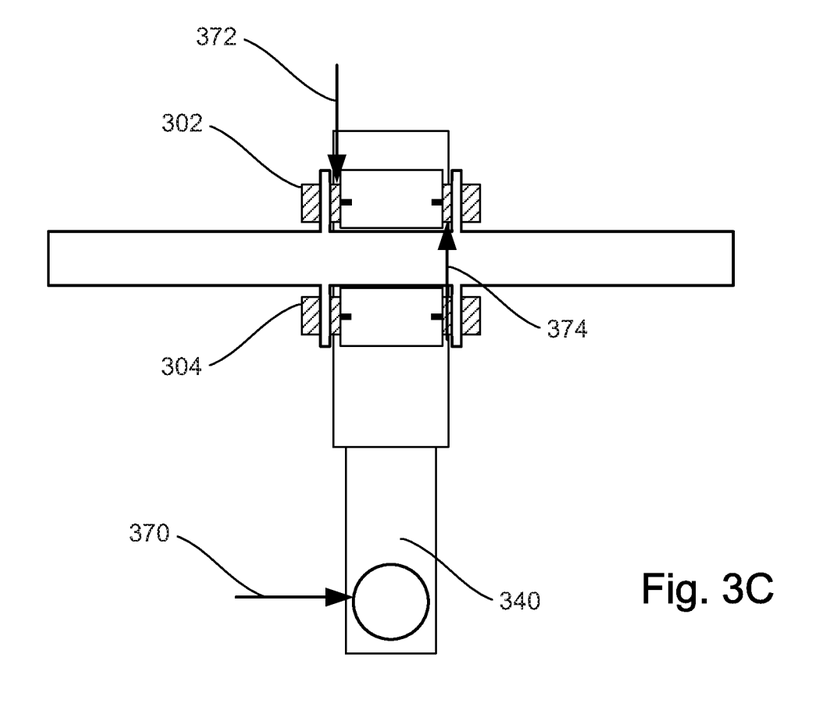

FIG. 3C illustrates an overhead perspective view, and the forces acting on the pins 302 and 304 when a lateral force 370 is imparted on the trailer hitch arm 340. As noted above, a lateral force may occur when the trailer is out of alignment with or at an angle with respect to a center line of the vehicle (i.e., axis 250 in FIGS. 2A and 2B). This may be due to an asymmetry or difference in weight on a left and right side of the trailer, or a difference in the tires or other aspect of the trailer or vehicle.

When a force 370 is imparted laterally on the trailer hitch arm 340, a corresponding change in the magnetic field of magnetoelastic pin 302 may be determined by the sensors. A left side sensor may detect a force 372 acting on a left side of magnetoelastic pin 302, while a right side sensor may detect a force 374 acting on the right side of magnetoelastic pin 302 in an opposite direction. In some examples, the second pin 304 may not experience any substantial or significant changes due to the lateral force 370, due to the ability of the second pin 304 to slide within the oblong coupling. In this case, the left side of the pin 304 may slide in the direction of arrow 372, while the right side of pin 304 slides in the direction of arrow 374.

The vehicle processor may determine, based on the two or more sensors corresponding to the first magnetoelastic pin 302 (and/or second magnetoelastic pin 304), that a first end of the first magnetoelastic pin flexes in a first direction (372), and a second end of the first magnetoelastic sensor flexes in a second direction (374) opposite the first direction. The processor may then responsively determine that a lateral force is acting on the trailer hitch receiver, and may determine a magnitude of the lateral force based on the amount of change to the magnetic field of magnetoelastic pin 302.

Figure 3D:
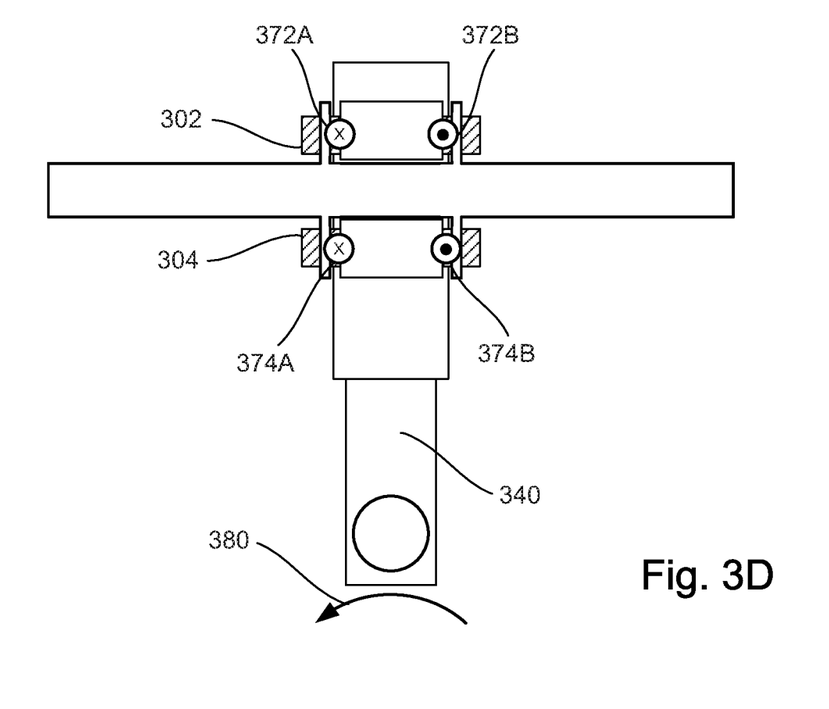

FIG. 3D illustrates a top perspective view in which a rotational force 380 is acting on the trailer hitch arm 340. As noted above, the rotational force 380 may be caused by the trailer rolling with respect to the vehicle, such as due to a flat tire or uneven surface.

When a rotational force 380 is imparted on the trailer hitch arm 340 causing a rolling motion of the arm 340, a corresponding force may be experienced by the magnetoelastic pins 302 and 304. As shown in FIG. 3D, when the rotational force 380 is imparted counterclockwise on the trailer hitch receiver, the left side of pins 302 and 304 may experience a force into the page, as shown by arrows 372A and 374A respectively. At the same time, the right side of pins 302 and 304 may experience a force out of the page, shown by arrows 372B and 374B respectively.

The processor may be configured to determine, based on the two or more sensors corresponding to the first magnetoelastic pin 302, that a first end of the first magnetoelastic pin 302 flexes in a first direction (into the page), and a second end of the first magnetoelastic pin 302 flexes in a second direction opposite the first direction (out of the page). Similarly, the processor may be configured to determine, based on the two or more sensors corresponding to the second magnetoelastic pin 304, that a first end of the second magnetoelastic pin 304 flexes in the first direction (into the page), and a second end of the second magnetoelastic pin 304 flexes in the second direction (out of the page) opposite the first direction. The processor may further be configured to responsively determine that a rotational force is acting on the trailer hitch receiver. The magnitude of the rotational force may be determined based on a combination of the changes to the magnetic fields of magnetoelastic pins 302 and 304.

As shown in FIGS. 3A-D, forces acting on the trailer hitch arm 340 can be determined in all directions. And by combining two or more of the determinations shown in FIGS. 3A-D, the processor may be configured to determine the directional components of one or more forces acting on the trailer hitch arm that are not purely vertical, lateral, longitudinal, or rotational, but are a combination of two or more directions.

Once a force direction and magnitude is determined, the processor may be configured to display the determined force direction and/or magnitude on a vehicle display. This may allow a driver to determine whether the trailer is properly secured, loaded evenly, or whether some other issue with the trailer is present. Further, in some examples the determined force direction and magnitude may be transmitted to a remote computing device, such as a driver's smart phone. The remote computing device may include an application for use by a driver that allows him or her to see the effect of any adjustments made to the trailer relating to weight distribution in real or near-real time.

Figure 4:
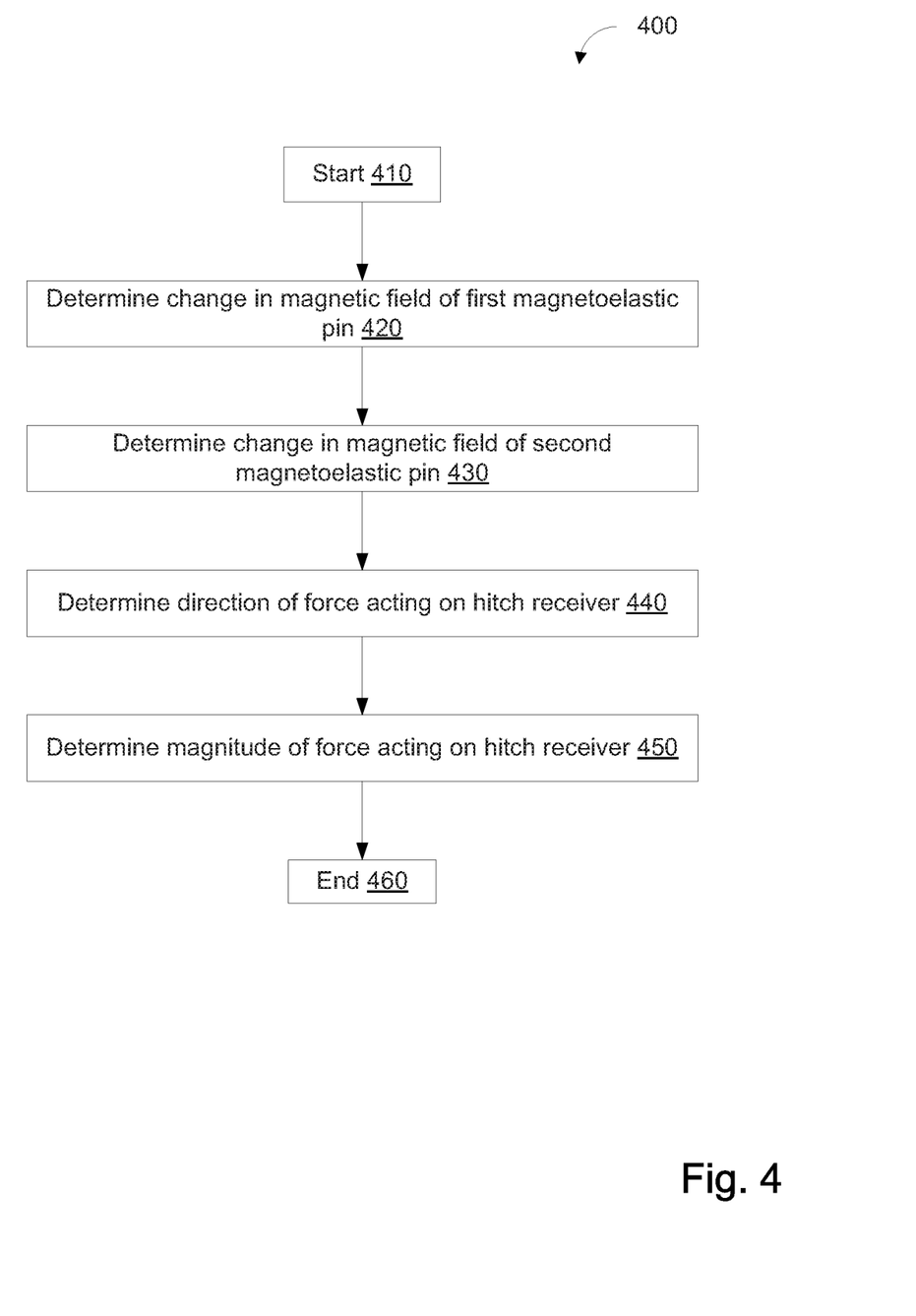
FIG. 4 illustrates a flowchart of an example method according to embodiments of the present disclosure.

FIG. 4 illustrates a flowchart of an example method 400 according to embodiments of the present disclosure. Method 400 may enable a vehicle to determine the magnitude and direction of forces acting on a trailer hitch receiver. The flowchart of FIG. 4 is representative of machine readable instructions that are stored in memory and may include one or more programs which, when executed by a processor may cause vehicle 100 and/or one or more systems or devices to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1, 2A-B, and 3A-D, some functions of those components will not be described in detail below.

Method 400 may start at block 410. At block 420, method 400 may include determining a change in the magnetic field corresponding to a first magnetoelastic pin, wherein the first magnetoelastic pin is configured to couple a trailer hitch receiver to a vehicle chassis as described within this disclosure. At block 430, method 400 may include determining a change in a magnetic field of a second magnetoelastic pin. The second magnetoelastic pin may similarly be configured to couple the trailer hitch receiver to the vehicle chassis as described herein. The changes in the magnetic fields may be determined by one or more sensors positioned on or nearby the magnetoelastic pins, such that they can detect changes to the shape, orientation, strength, intensity, size, or any other characteristic of the magnetic fields of the magnetoelastic pins.

At block 440, method 400 may include determining a direction of the force acting on the trailer hitch receiver. This may be determined based on the changes to the magnetic fields, described with respect to FIGS. 3A-D. Block 440 may include determining the component forces acting in each direction when there is a force that is not purely in one direction.

At block 450, method 400 may include determining a magnitude of the force acting on the trailer hitch receiver. The magnitude may be determined based on the amount of change to the magnetic fields of the magnetoelastic pins.

In some examples, method 400 may further include displaying or transmitting for display the determined direction and magnitude of the forces acting on the trailer hitch receiver.

In further examples, one or more vehicle systems may make use of the determined magnitude and direction for feedback to make adjustments to one or more vehicle systems. For instance, when it is determined that there is a large longitudinal force (i.e., front to back force), and engine controller may make one or more adjustments. Various other vehicle systems may make adjustments based on the determined force direction and magnitude, in order to ensure a safe and comfortable driver experience.

Method 400 may end at block 460. In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a trailer hitch receiver configured to receive a trailer hitch arm along an axis;
two magnetoelastic pins, having respective magnetic fields, configured to couple the trailer hitch receiver to a chassis, the two magnetoelastic pins disposed above and perpendicular to the axis;
a plurality of sensors corresponding to the two magnetoelastic pins, configured to detect changes in the respective magnetic fields; and
a processor configured to determine a magnitude and a direction of a force acting on the trailer hitch receiver based on data from the plurality of sensors.

2. The vehicle of claim 1, wherein the two magnetoelastic pins are further configured to flex based on the magnitude and the direction of the force acting on the trailer hitch receiver, wherein the plurality of sensors are configured to detect respective changes in the magnetic fields corresponding to an amount of flex of the two magnetoelastic pins.

3. The vehicle of claim 1, wherein one or both of the two magnetoelastic pins are configured to flex based on a vertical force, a lateral force, a longitudinal force, and a rotational force acting on the trailer hitch receiver, wherein the vertical force, the lateral force, and the longitudinal force are perpendicular to each other.

4. The vehicle of claim 1, wherein the processor is further configured to:
  determine that a first pin of the two magnetoelastic pins has flexed in a first direction;
  determine that a second pin of the two magnetoelastic pins has flexed in a second direction opposite the first direction; and
  responsively determine that a vertical force is acting on the trailer hitch receiver.

5. The vehicle of claim 1, wherein the trailer hitch receiver includes an opening configured to engage the trailer hitch arm along the axis, and wherein the two magnetoelastic pins include a first magnetoelastic pin and a second magnetoelastic pin centered on the axis.

6. The vehicle of claim 5, wherein the first magnetoelastic pin is configured to couple the trailer hitch receiver to the chassis using a circular coupling, and the second magnetoelastic pin is configured to couple the trailer hitch receiver to the chassis using an oblong coupling.

7. The vehicle of claim 6, wherein the second magnetoelastic pin is configured to slide within the oblong coupling in response to a longitudinal force, and wherein the processor is further configured to:
  determine that the first magnetoelastic pin has flexed in a first direction by a first amount;
  determine that the second magnetoelastic pin has flexed in the first direction by a second amount;
  responsively determine that the longitudinal force is acting on the trailer hitch receiver; and
  determine a magnitude of the longitudinal force based on a differential between the first amount and the second amount.

8. The vehicle of claim 6, wherein the plurality of sensors includes two or more sensors corresponding to each of the first and second magnetoelastic pins.

9. The vehicle of claim 8, wherein the processor is further configured to:
  determine, based on the two or more sensors corresponding to the first magnetoelastic pin, that a first end of the first magnetoelastic pin flexes in a first direction, and a second end of the first magnetoelastic pin flexes in a second direction opposite the first direction; and
  responsively determine that a lateral force is acting on the trailer hitch receiver.

10. The vehicle of claim 8, wherein the processor is further configured to:
  determine, based on the two or more sensors corresponding to the first magnetoelastic pin, that a first end of the first magnetoelastic pin flexes in a first direction, and a second end of the first magnetoelastic pin flexes in a second direction opposite the first direction;
  determine, based on the two or more sensors corresponding to the second magnetoelastic pin, that a first end of the second magnetoelastic pin flexes in the first direction, and a second end of the second magnetoelastic pin flexes in the second direction opposite the first direction; and
  responsively determine that a rotational force is acting on the trailer hitch receiver.

11. The vehicle of claim 5, wherein the processor is further configured to determine all directional components of the force based on data received from the plurality of sensors.

12. The vehicle of claim 1, wherein the processor is further configured to estimate a mass of a trailer coupled to the trailer hitch receiver based on the magnitude of the force.

13. The vehicle of claim 1, wherein the processor is further configured to transmit the magnitude and the direction of the force for display on a remote computing device.

14. A method for determining a force acting on a trailer hitch receiver comprising:
  determining, via a plurality of sensors corresponding to two magnetoelastic pins coupling the trailer hitch receiver to a chassis of a vehicle, respective changes in magnetic fields corresponding to the two magnetoelastic pins, the two magnetoelastic pins disposed above the trailer hitch receiver;
  receiving, by a vehicle processor, data corresponding to the respective changes in the magnetic fields; and
  responsively determining, by the vehicle processor, a magnitude and direction of the force acting on the trailer hitch receiver based on the data.

15. The method of claim 14, further comprising:
  determining that a first pin of the two magnetoelastic pins has flexed in a first direction;
  determining that a second pin of the two magnetoelastic pins has flexed in a second direction opposite the first direction; and
  responsively determining that a vertical force is acting on the trailer hitch receiver.

16. The method of claim 14, wherein (i) the trailer hitch receiver includes an opening configured to engage a trailer hitch arm along an axis, (ii) the two magnetoelastic pins include first and second magnetoelastic pins oriented perpendicular to and centered on the axis, (iii) the first magnetoelastic pin is configured to couple the trailer hitch receiver to the chassis using a circular coupling, and (iv) the second magnetoelastic pin is configured to couple the trailer hitch receiver to the chassis using an oblong coupling.

17. The method of claim 16, wherein the second magnetoelastic pin is configured to slide within the oblong coupling in response to a longitudinal force, the method further comprising:
  determining that the first magnetoelastic pin has flexed in a first direction by a first amount;
  determining that the second magnetoelastic pin has flexed in the first direction by a second amount;
  responsively determining that the longitudinal force is acting on the trailer hitch receiver; and
  determining a magnitude of the longitudinal force based on a differential between the first amount and the second amount.

18. The method of claim 16, wherein the plurality of sensors includes two or more sensors corresponding to each of the first and second magnetoelastic pins, the method further comprising:
  determining, based on the two or more sensors corresponding to the first magnetoelastic pin, that a first end of the first magnetoelastic pin flexes in a first direction, and a second end of the first magnetoelastic pin flexes in a second direction opposite the first direction; and responsively determining that a lateral force is acting on the trailer hitch receiver.

19. The method of claim 16, wherein the plurality of sensors includes two or more sensors corresponding to each of the first and second magnetoelastic pins, the method further comprising:
  determining, based on the two or more sensors corresponding to the first magnetoelastic pin, that a first end of the first magnetoelastic pin flexes in a first direction, and a second end of the first magnetoelastic pin flexes in a second direction opposite the first direction;
  determining, based on the two or more sensors corresponding to the second magnetoelastic pin, that a first end of the second magnetoelastic pin flexes in the first direction, and a second end of the second magnetoelastic pin flexes in the second direction opposite the first direction; and
  responsively determine that a rotational force is acting on the trailer hitch receiver.

20. The method of claim 14, further including:
  estimating a mass of a trailer coupled to the trailer hitch receiver based on the magnitude of the force.

* * * * *

UNITED STATES PATENT AND TRADEMARK OFFICE
CERTIFICATE OF CORRECTION

PATENT NO. : 10,589,583 B2
APPLICATION NO. : 15/815640
DATED : March 17, 2020
INVENTOR(S) : Andrew Niedert et al.

Page 1 of 1

It is certified that error appears in the above-identified patent and that said Letters Patent is hereby corrected as shown below:

On the Title Page

Item (72) should read:
Inventors: Andrew Niedert, Farmington Hills, MI (US); Rinku Patel, Kalamazoo, MI (US); Anton Rogness, Dearborn, MI (US); Elliott Pearson, Shelby Township, MI (US); Chad Reed, Southfield, MI (US); Johannes Gießibl, Amerang (DE)

Signed and Sealed this
Twenty-fifth Day of August, 2020

Andrei Iancu
*Director of the United States Patent and Trademark Office*